US00RE50787E

(19) United States
(12) Reissued Patent
Muscato

(10) Patent Number: US RE50,787 E
(45) **Date of Reissued Patent: *Feb. 10, 2026**

(54) FLAT HAIR CLIP

(71) Applicant: Teleties, LLC, Maitland, FL (US)

(72) Inventor: Lindsay Muscato, Maitland, FL (US)

(73) Assignee: Teleties, LLC, Maitland, FL (US)

( * ) Notice: This patent is subject to a terminal disclaimer.

(21) Appl. No.: 29/989,569

(22) Filed: Feb. 13, 2025

Related U.S. Patent Documents

Reissue of:
(64) Patent No.: Des. 1,031,161
Issued: Jun. 11, 2024
Appl. No.: 29/926,096
Filed: Jan. 29, 2024

U.S. Applications:
(62) Division of application No. 29/989,558, filed on Feb. 13, 2025, which is an application for the reissue of Pat. No. Des. 1,031,161.

(51) LOC (15) Cl. ..... 28-03
(52) U.S. Cl.
USPC ..... D28/40
(58) Field of Classification Search
USPC ..... D28/10, 39, 40, 41, 42, 43
(Continued)

(56) References Cited

U.S. PATENT DOCUMENTS 5,605,166 A * 2/1997 Chou ..... A45D 8/30 132/277
D393,927 S * 4/1998 Chou ..... D28/42
(Continued)

FOREIGN PATENT DOCUMENTS

CN 307007035 12/2021
CN 307013072 * 12/2021
(Continued)

OTHER PUBLICATIONS

French Small Open Rectangle Tort Crock—Pair [online], URL: < https://www.gladhair.com/collections/alligator-hair-clips/products/small-open-rectangle-tort-crock-pair >. [Retrieved from the internet on Mar. 4, 2024].
(Continued)

*Primary Examiner* — Darlington Ly
(74) *Attorney, Agent, or Firm* — Hill Ward Henderson, P.A.; Stephen E. Kelly; Andriy Lytvyn

(57) CLAIM

The ornamental design for a flat hair clip, as shown and described.

DESCRIPTION

[FIG. 1 is a perspective view of a first embodiment of a flat hair clip according to the present design.]
[FIG. 2 is a front elevation view thereof.]
[FIG. 3 is a rear elevation view thereof.]
[FIG. 4 is a left side elevation view thereof.]
[FIG. 5 is a right side elevation view thereof.]
[FIG. 6 is a top view thereof.]
[FIG. 7 is a bottom view thereof.]
FIG. 8 is a perspective view of [a second embodiment of] a flat hair clip according to the present design.
FIG. 9 is a front elevation view thereof.
FIG. 10 is a rear elevation view thereof.
FIG. 11 is a left side elevation view thereof.
FIG. 12 is a right side elevation view thereof.
FIG. 13 is a top view thereof.
FIG. 14 is a bottom view thereof.
[FIG. 15 is a perspective view of a third embodiment of a hair clip with open sides according to the present design.]
[FIG. 16 is a front elevation view thereof.]
[FIG. 17 is a rear elevation view thereof.]
[FIG. 18 is a left side elevation view thereof.]
[FIG. 19 is a right side elevation view thereof.]
[FIG. 20 is a top view thereof; and,]
[FIG. 21 is a bottom view thereof.]
(Continued)

(Amended)

*The broken lines in the drawings depict portions of the flat hair clip that form no part of the claimed design.*

1 Claim, 21 Drawing Sheets

Figure 1:
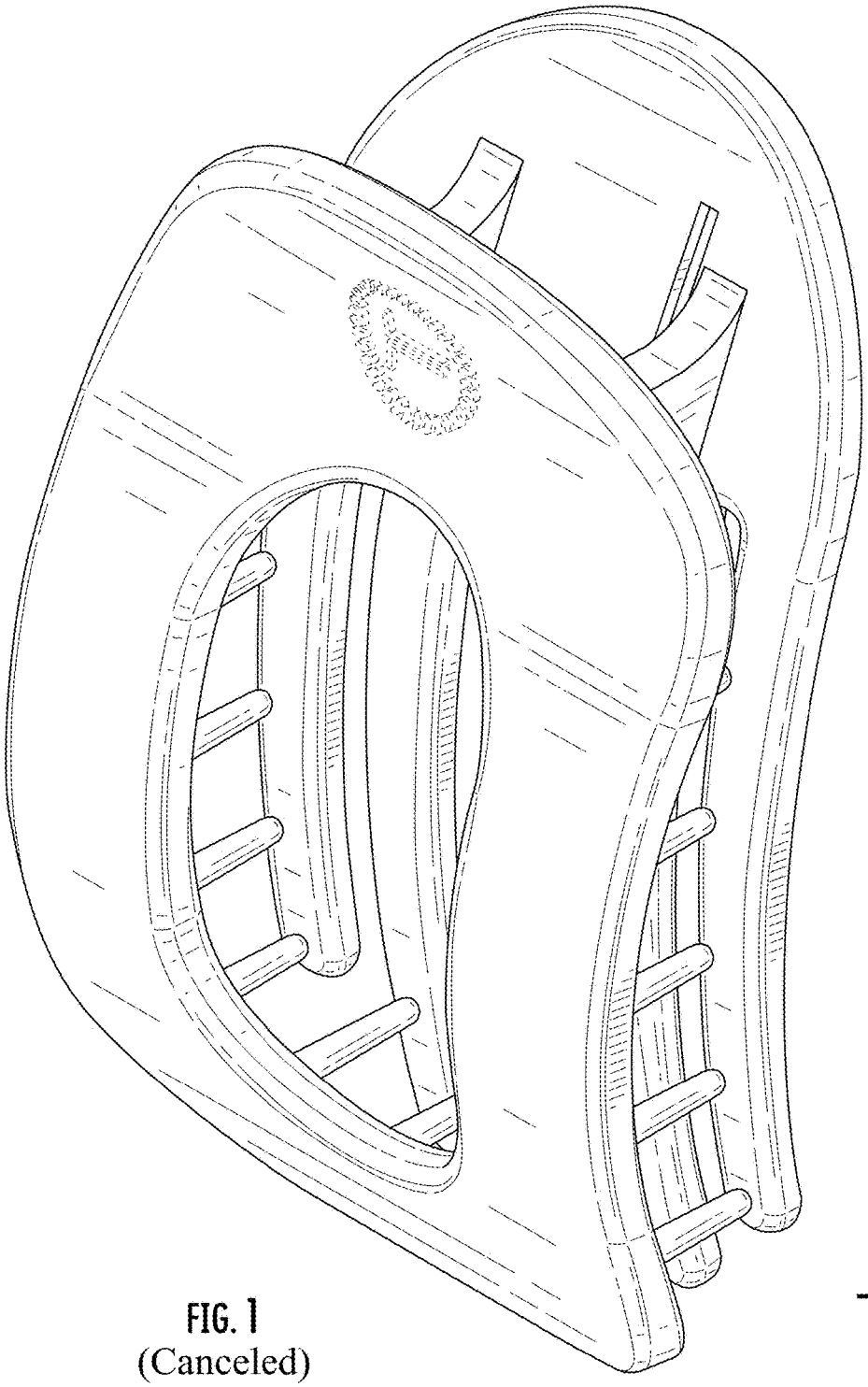
Figure 2:
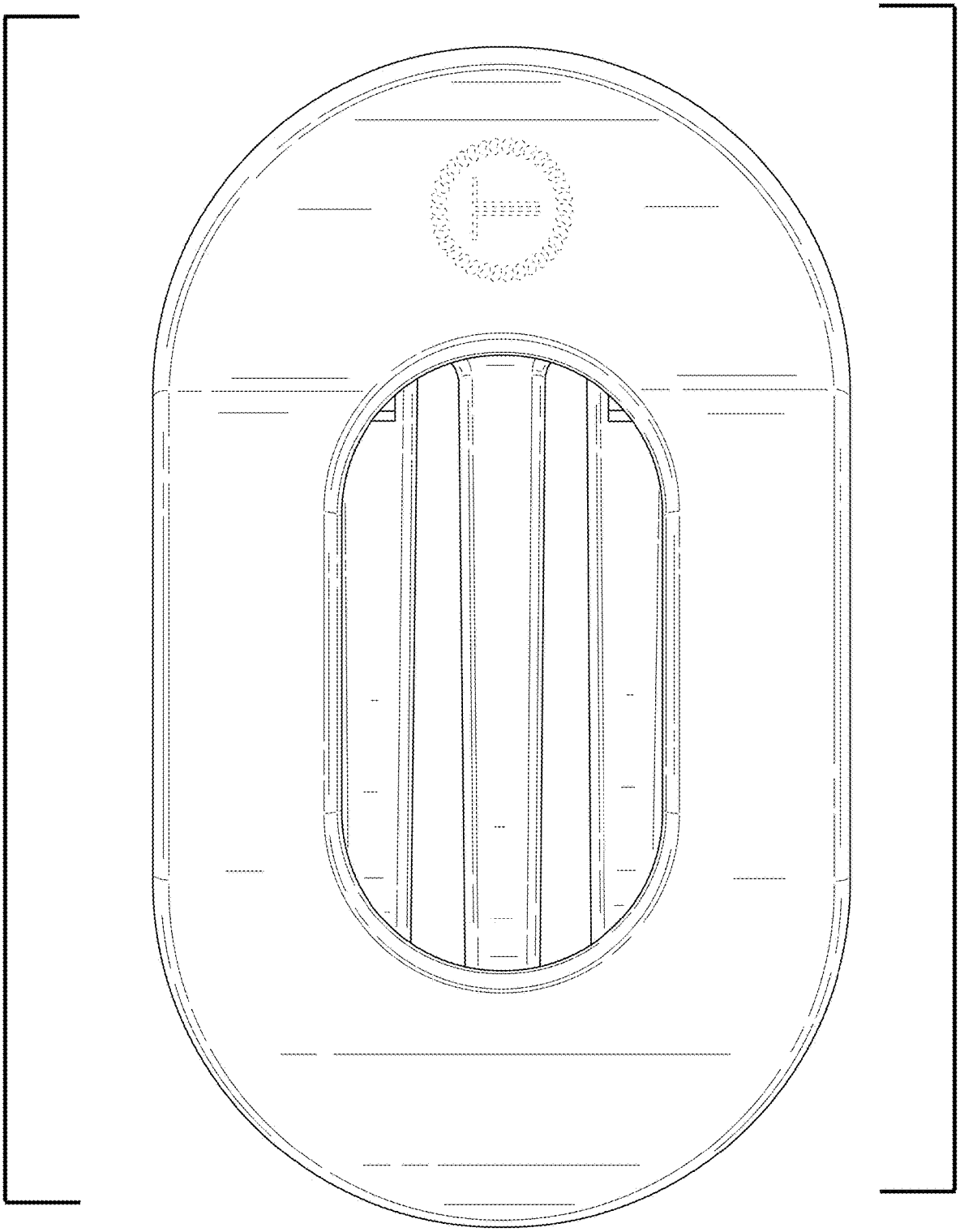
Figure 3:
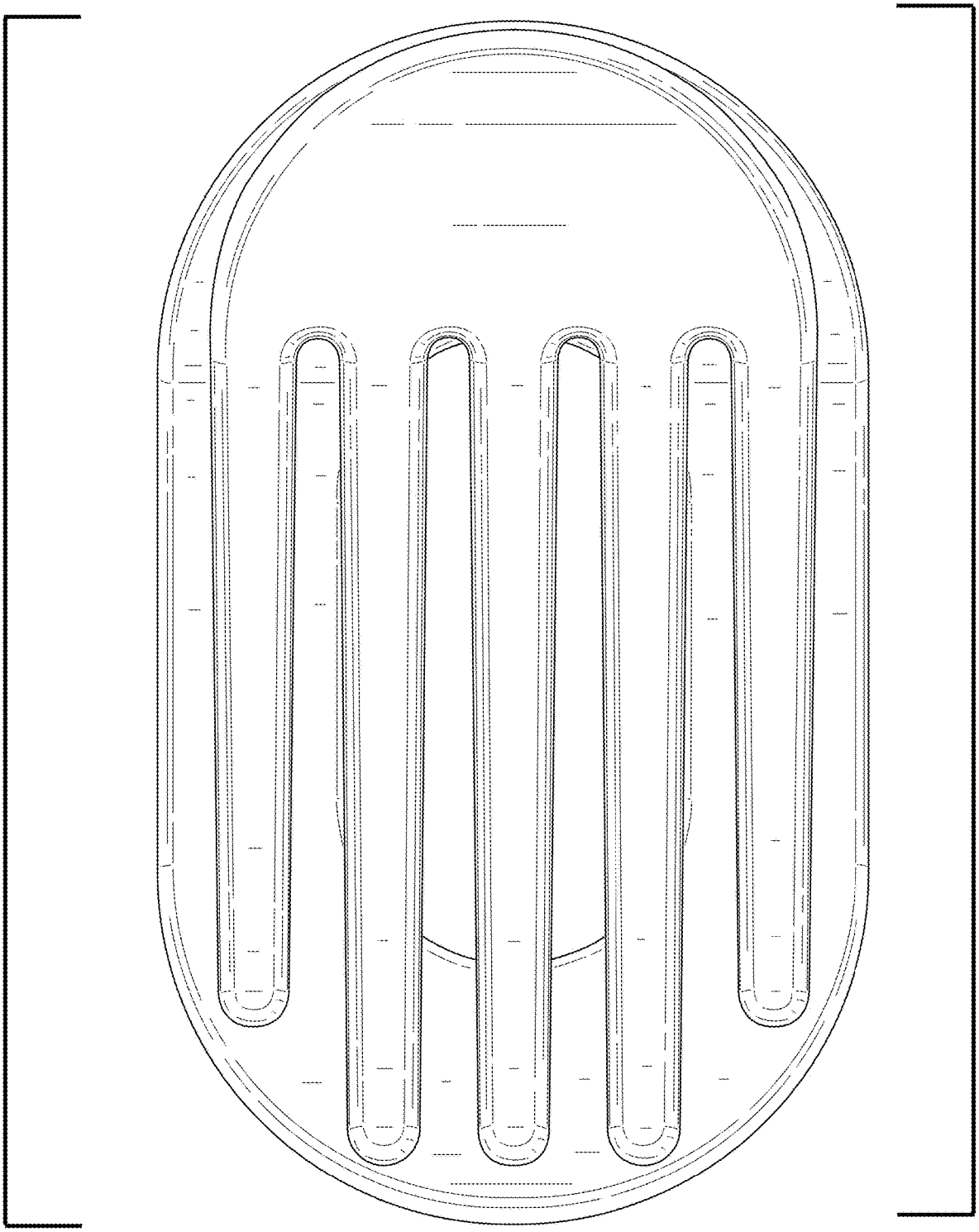
Figure 4:
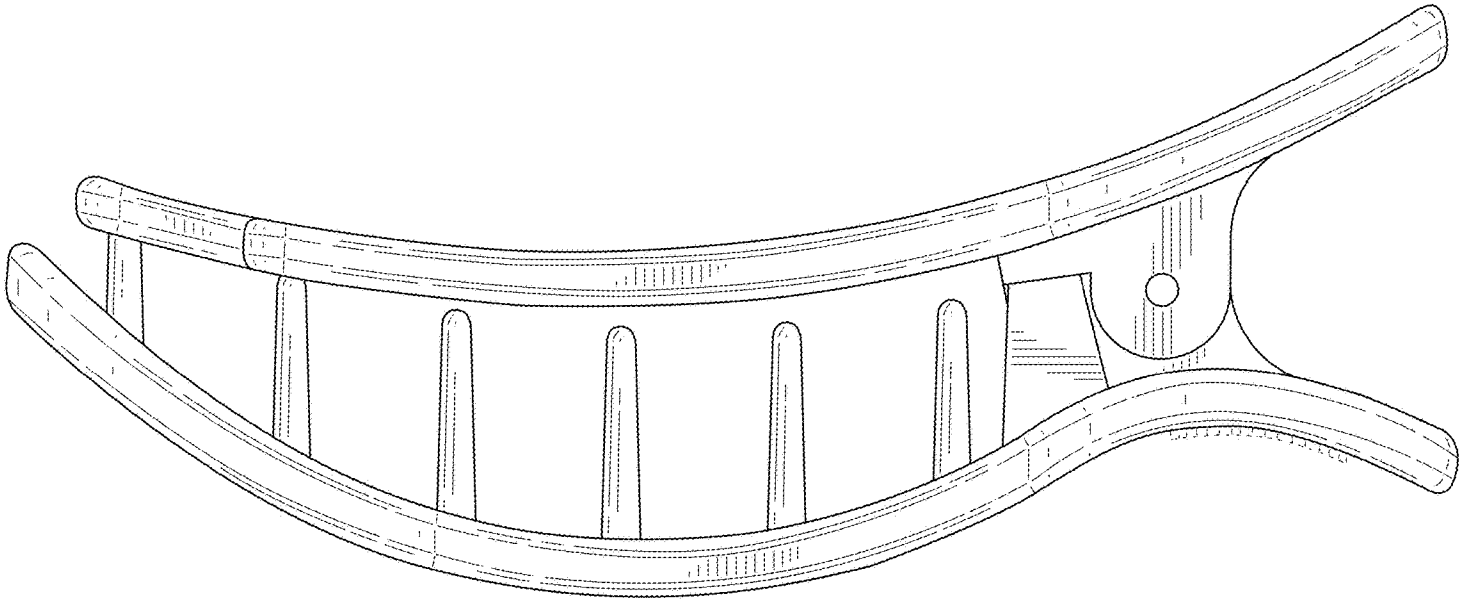
Figure 5:
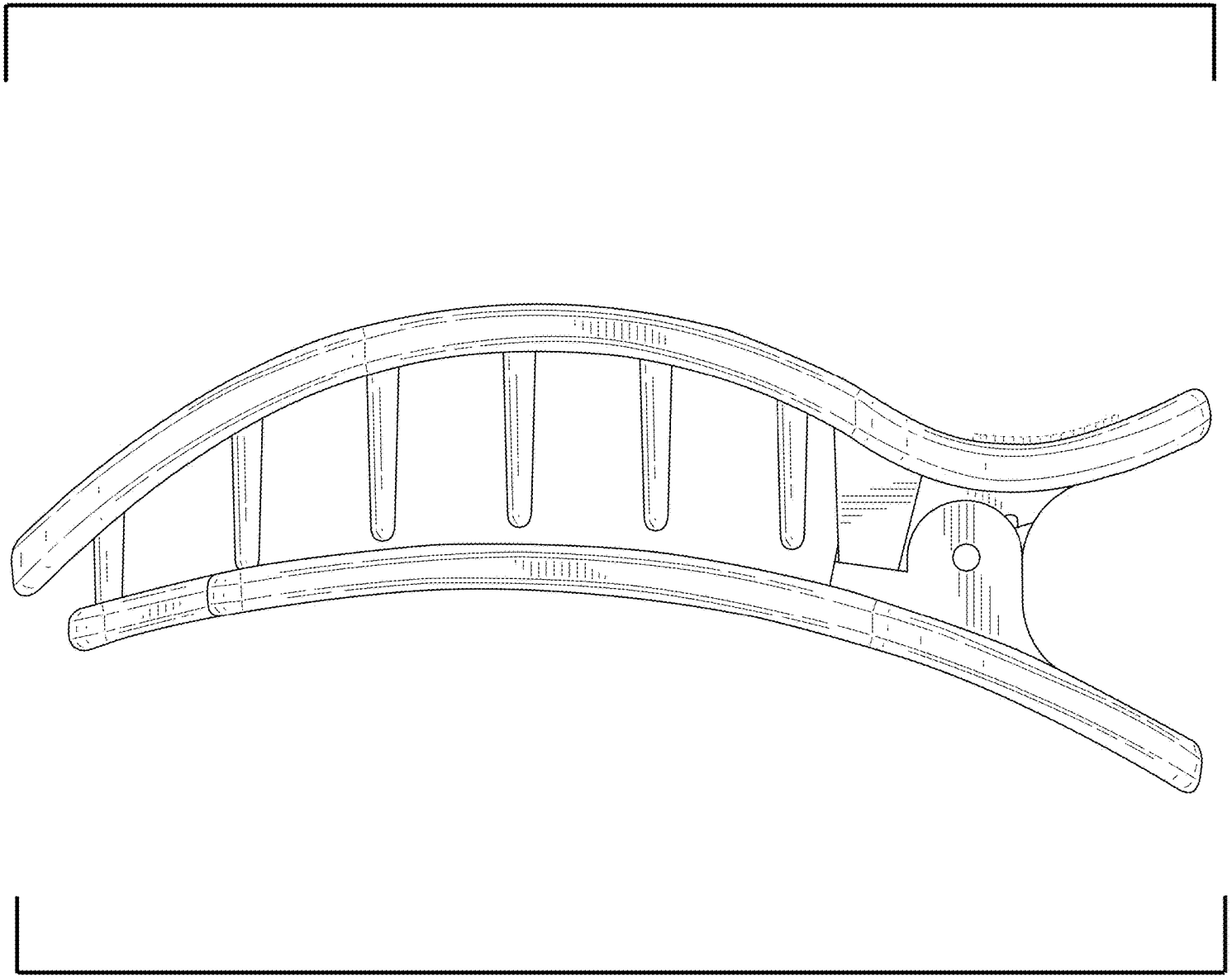
Figure 6:
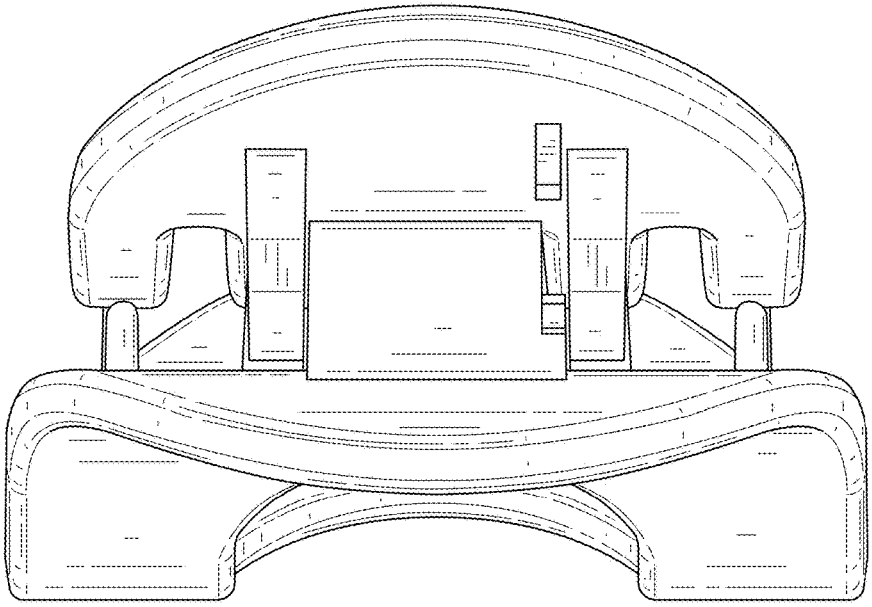
Figure 7:
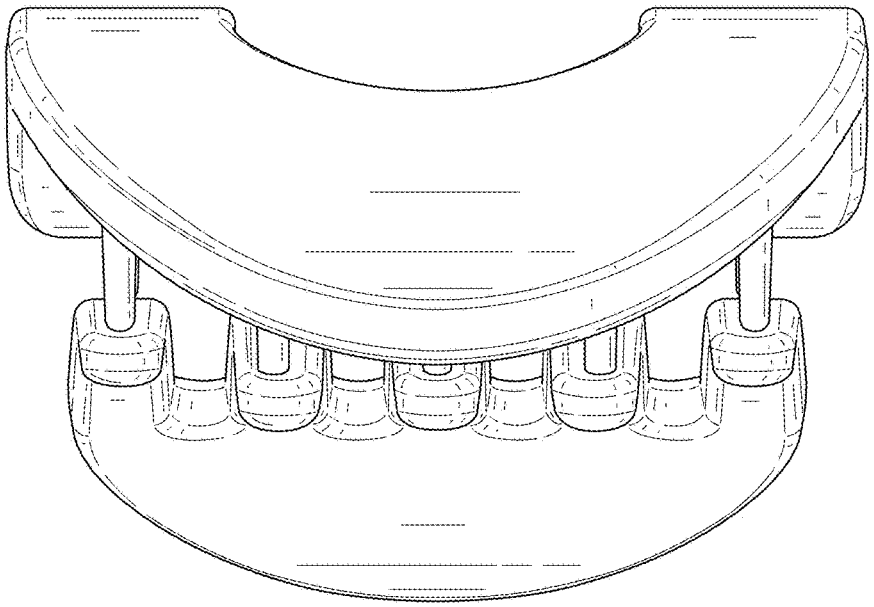
Figure 15:
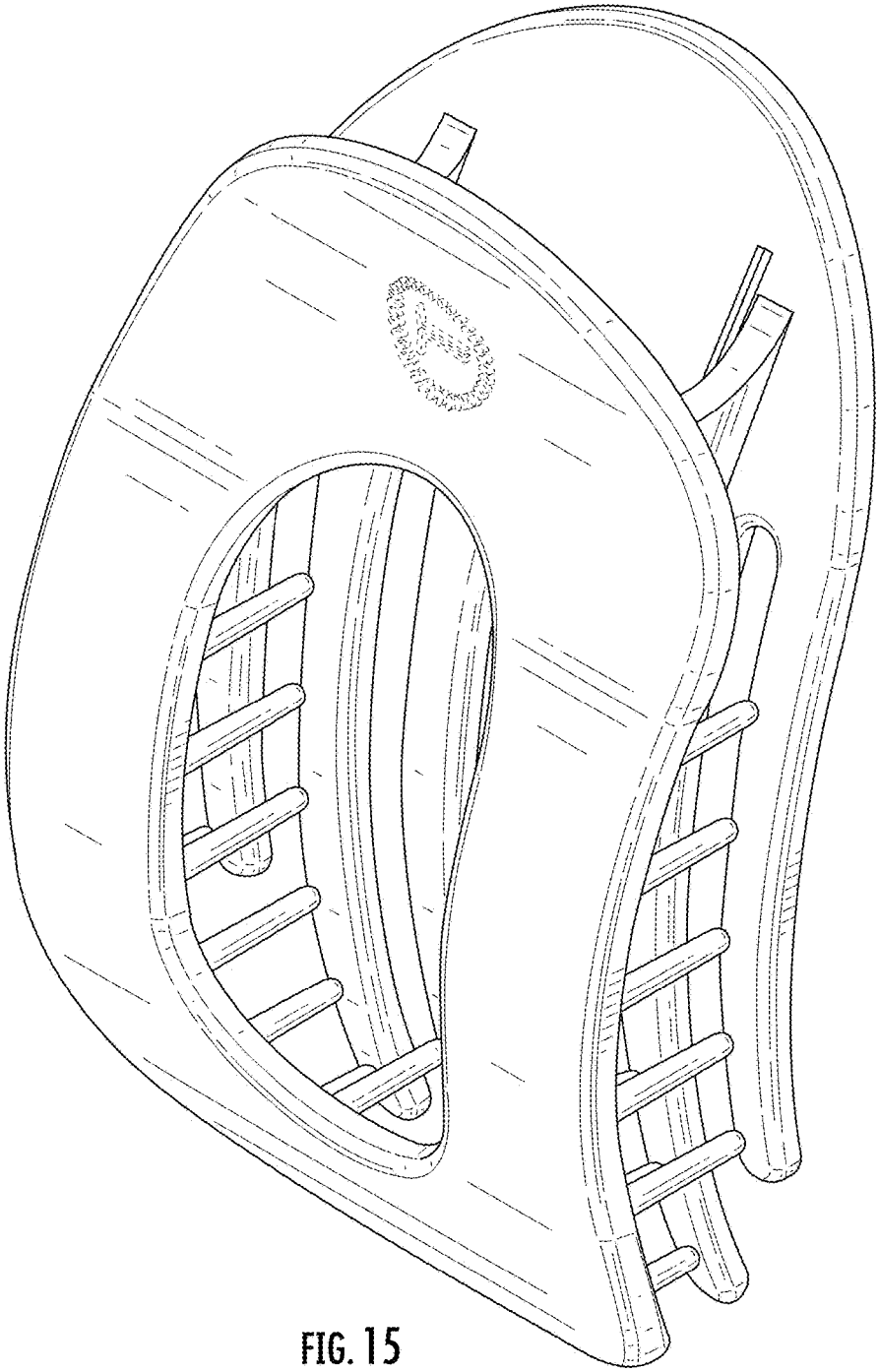
Figure 16:
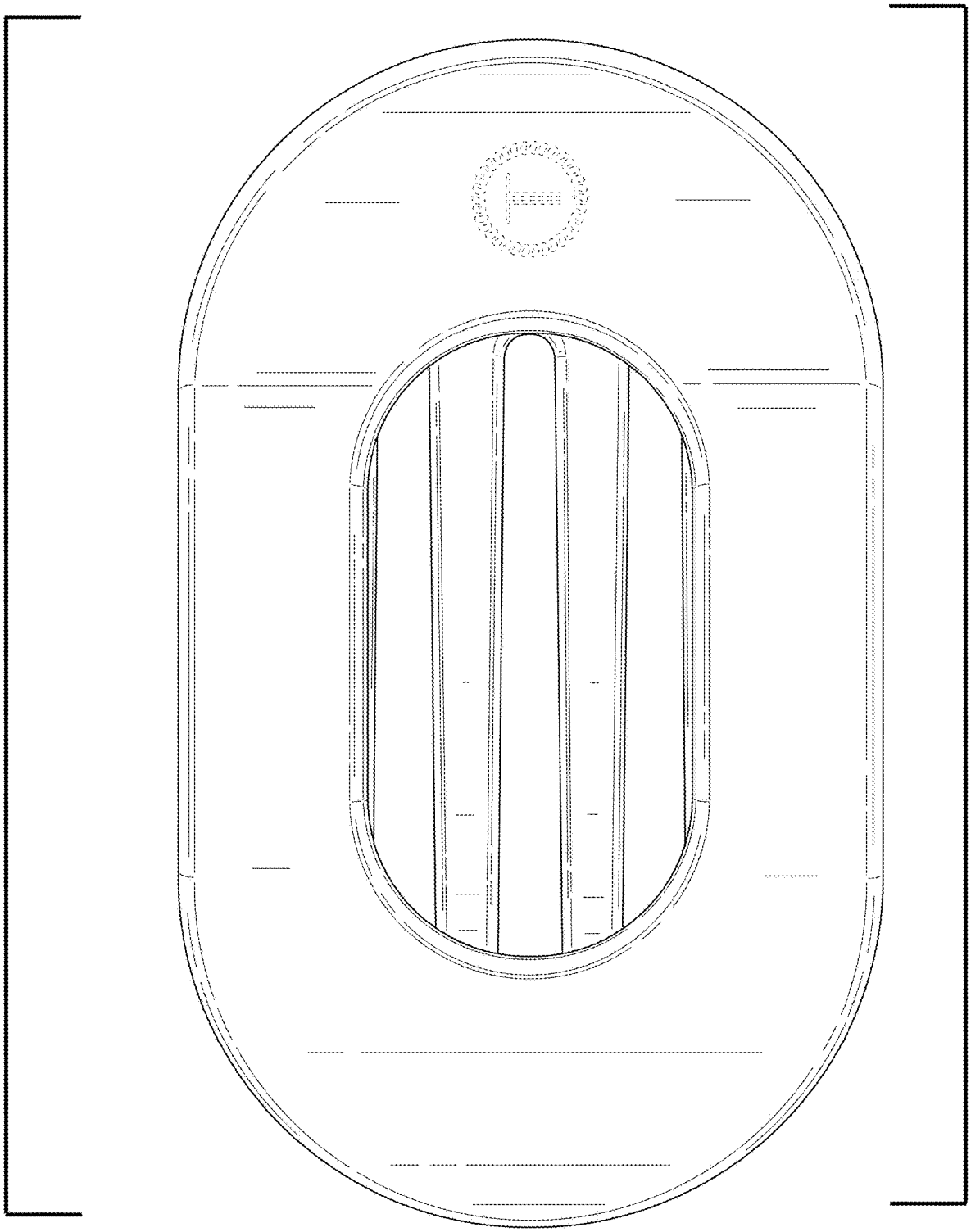
Figure 17:
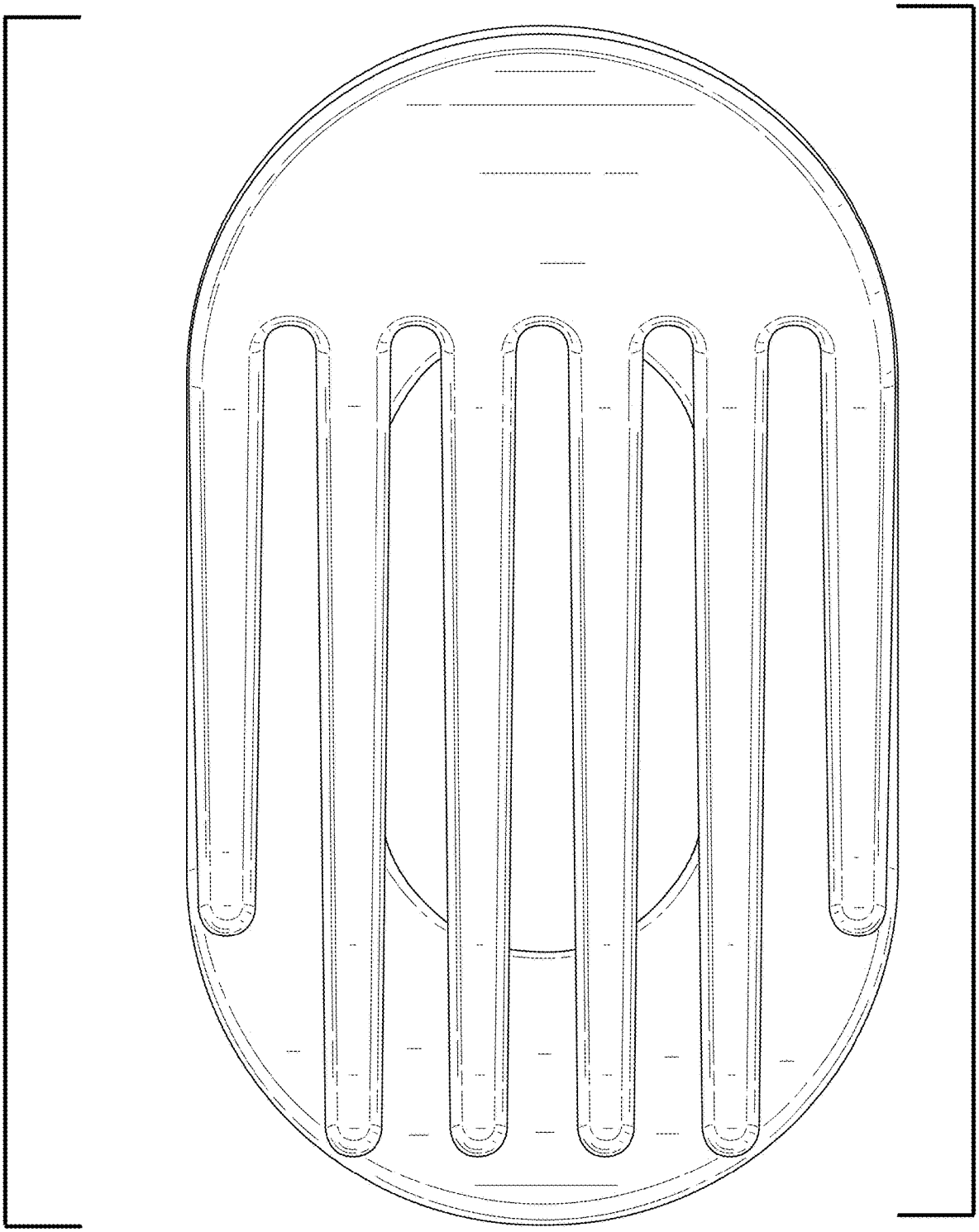
Figure 18:
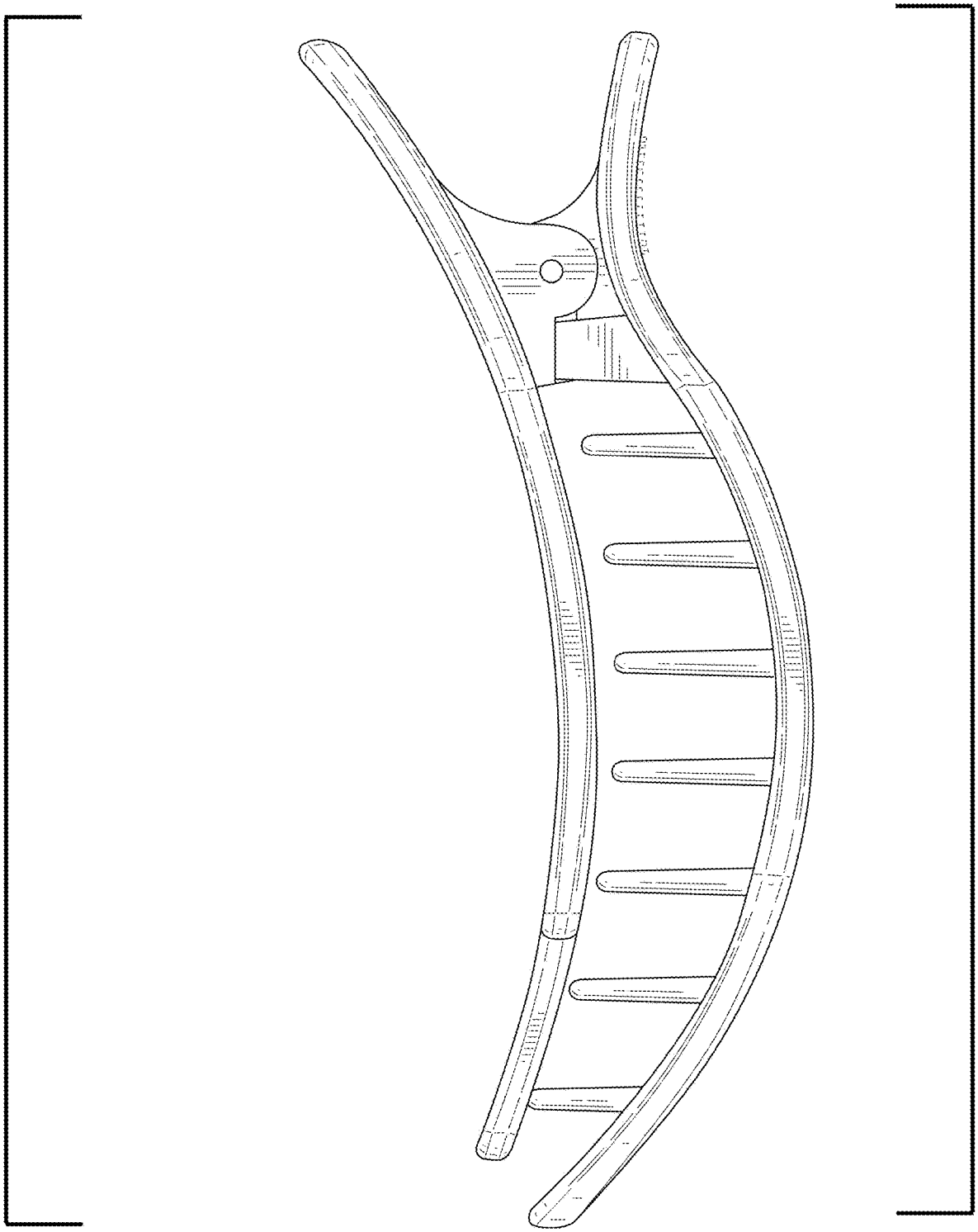
Figure 19:
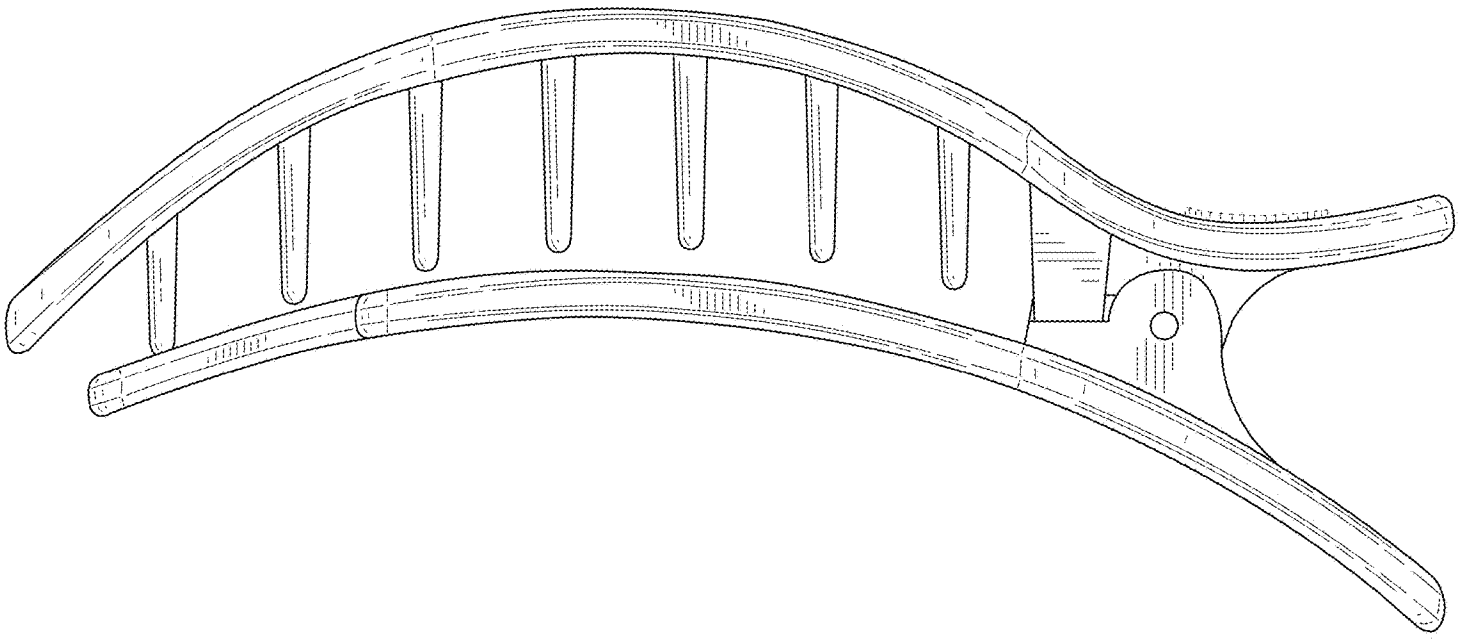
Figure 20:
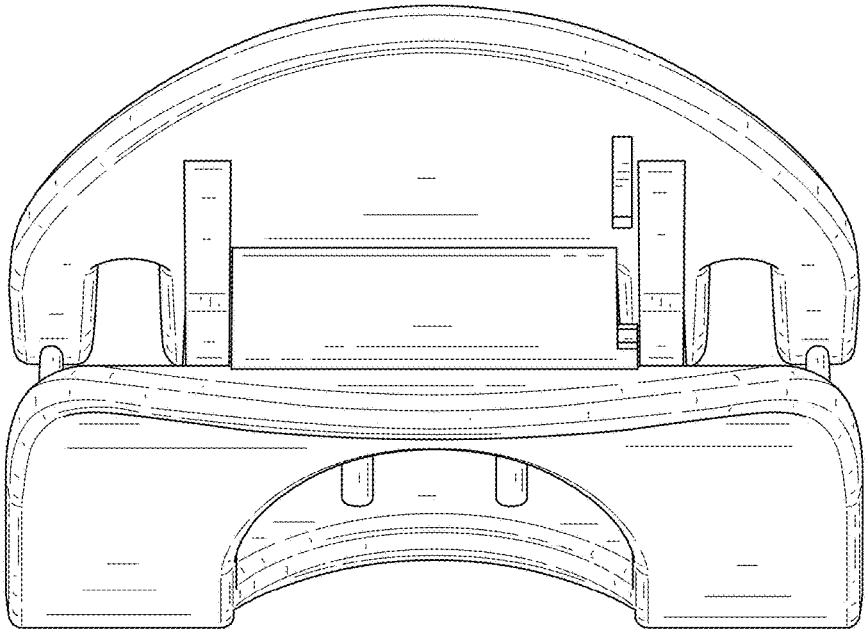
Figure 21:
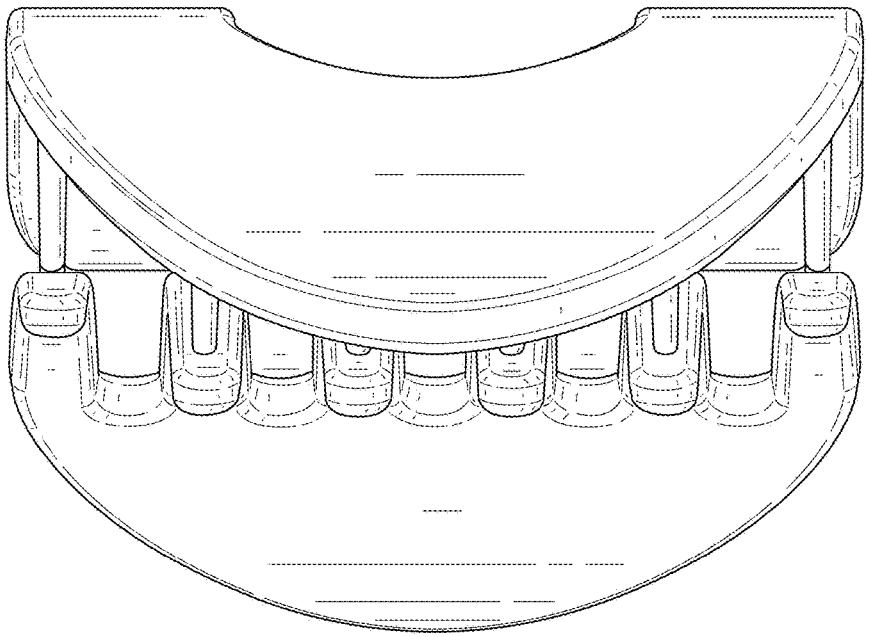

Matter enclosed in heavy brackets [ ] appears in the original patent but forms no part of this reissue; matter printed in italics indicates the additions made by reissue.

(58) Field of Classification Search
CPC ..... A45D 8/00; A45D 8/001; A45D 8/002; A45D 8/02; A45D 8/14; A45D 8/20; A45D 8/22; A45D 8/24; A45D 8/26; A45D 8/28; A45D 8/30; A45D 8/32; Y10T 24/44; Y10T 24/44923
See application file for complete search history.

(56) References Cited

U.S. PATENT DOCUMENTS

| | | | | | |
|---|---|---|---|---|---|
| D393,928 | S | * | 4/1998 | Chou | D28/42 |
| D410,302 | S | | 5/1999 | Yasuda | |
| 6,446,639 | B1 | * | 9/2002 | Shyu | A45D 8/20 132/277 |
| D473,015 | S | | 4/2003 | Shyu | |
| D540,982 | S | * | 4/2007 | Vergona | D28/40 |
| D566,895 | S | * | 4/2008 | Vergona | D28/40 |
| D580,103 | S | * | 11/2008 | Pichon | D28/39 |
| D590,102 | S | * | 4/2009 | Hsu | D28/39 |
| D637,348 | S | | 5/2011 | Richmond et al. | |
| 7,992,579 | B2 | * | 8/2011 | Longoria | A45D 8/20 132/279 |
| 9,072,355 | B1 | | 7/2015 | Magnani | A45D 8/24 |
| D737,510 | S | | 8/2015 | Wright et al. | |
| D794,870 | S | * | 8/2017 | Hsu | D28/40 |
| D829,990 | S | | 10/2018 | Hsu | |
| D901,080 | S | * | 11/2020 | Hsu | D28/40 |
| D917,782 | S | | 4/2021 | Chu | A45D 8/30 D28/42 |
| D960,447 | S | | 8/2022 | Carter | D28/20 |
| 11,497,289 | B2 | * | 11/2022 | Hsu | A45D 8/22 |
| D981,643 | S | | 3/2023 | Chen | D28/40 |
| D982,235 | S | * | 3/2023 | Chen | D28/40 |
| D982,827 | S | * | 4/2023 | Chen | D28/40 |
| D1,002,104 | S | | 10/2023 | Cai | D28/40 |
| D1,006,324 | S | | 11/2023 | Zhou | |
| D1,031,161 | S | * | 6/2024 | Muscato | D28/40 |
| D1,068,163 | S | * | 3/2025 | Liu | D28/39 |
| D1,075,147 | S | * | 5/2025 | Muscato | D28/40 |

FOREIGN PATENT DOCUMENTS

| | | | | |
|---|---|---|---|---|
| CN | 307037790 | S | | 12/2021 |
| CN | 307037792 | | | 12/2021 |
| CN | 307409779 | | * | 6/2022 |
| CN | 307502404 | | * | 8/2022 |
| CN | 307728067 | | * | 12/2022 |
| CN | 307850270 | | * | 2/2023 |
| CN | 307881540 | | * | 2/2023 |
| CN | 307881541 | | | 2/2023 |
| GB | 6180944 | | | 12/2021 |
| GB | 6180949 | | | 12/2021 |
| GB | 6224102 | | | 9/2022 |

OTHER PUBLICATIONS

RC Roche Ornament [online], [publication date is Aug. 14, 2020]. [Retrieved from the internet on Mar. 13, 2024]. URL: <https://www.amazon.com/RC-ROCHE-ORNAMENT-Comfortable-Multicolor/dp/B07XQ5PHTH/ref>. (Year: 2020)., Aug. 14, 2020.

Flat Claw Clips [online], [publication date is Nov. 20, 2023]. [Retrieved from the internet on Mar. 13, 2024]. URL: <https://www.amazon.com/Ahoney-Alligator-Styling-Accessories-Neutral/dp/B0CMYJRFJZ/ref>. (Year: 2023)., Nov. 20, 2023.

"Crown Guide Hair Claw Clips", Crown Guide Hair Claw Clips [online], [publication date is Mar. 23, 2022]. [Retrieved from the internet on Mar. 13, 2024]. URL: <https://www.amazon.com/Crownguide-Womens-Crystal-Plastic-Accessory/dp/B08BNFYHM7/ref>. (Year: 2022)., Mar. 23, 2022.

4 Pcs Small Flat Hair Clips [Onl , "4 Pcs Small Flat Hair Clips [online]", https:// www.amazon.com/Non-slip-Resilient-Everyday-Accessory-Accessories/dp/B0CGWLVZB3/ref, Feb. 19, 2024.

Duckbill Claw Clip "Duckbill Claw Clip", https://www.shopandi.com/products/duckbill-claw-clip?variant=40447102091379.

Flat Lay Claw Clip , "Flat Lay Claw Clip", https://www.mykitsch.com/products/rabs-flat-lay-claw-clip-2pc-flat-black-tort?pr_prod_strat=jac&pr_rec_id=d23ee67c4&pr_rec_pid=7319130079413&pr_ref_pid=7285782315189&pr_seq=uniform.

Kaxi Lay Down Claw 2.0 , "Kaxi Lay Down Claw 2.0", https://www.shopkaxi.com/collections/all-products/products/kaxi-lay-down-claw-2-1.

Lay Down Claw Clip , "Lay Down Claw Clip", https://blissandbelleboutique.com/products/lay-down-claw-clip?pr_prod_strat=e5_desc&pr_rec_id=dc12661eb&pr_rec_pid=6923209080855&pr_ref_pid=6940501508119&pr_seq=uniform.

Parcelona [Online] , "Parcelona [online]", https://www.amazon.com/Parcelona-France-Celluloid-Tortoise-Clutcher/dp/B00QAPFPLI/ref, May 18, 2018.

RC Roche Ornament [online], [publication date is Jan. 13, 2023]. [Retrieved from the internet on Apr. 9, 2024]. URL: <https://www.amazon.com/RC-ROCHE-ORNAMENT-Comfortable-Multicolor/dp/B07XQ5PHTH/ref>. (Year: 2023).*

4 Pcs Small Flat Hair Clips [online], [publicaiton date is Feb. 19, 2024]. [Retrieved from the internet on Apr. 9, 2024]. URL: <https://www.amazon.com/Non-slip-Resilient-Everyday-Accessory-Accessories/dp/B0CGWLVZB3/ref>. (Year: 2024) .*

Parcelona [online], [publication date is May 18, 2018]. [Retrieved from the internet on Apr. 9, 2024]. URL: <https://www.amazon.com/Parcelona-France-Celluloid-Tortoise-Clutcher/dp/B00QAPFPLI/ref>. (Year: 2018).*

Tele_ties—The new Teleties Flat Round Clip [online], [publication date is Nov. 7, 2023]. [Retrieved from the internet on Apr. 9, 2024]. URL:<https://www.instagram.com/p/CzXMvkiN_C_/?hl=en>. (Year: 2023).*

Teleties—Small Flat Round Clip [online], [publication date is Dec. 23, 2023]. [Retrieved from the internet on Apr. 9, 2024]. URL: <https://www.amazon.com/TELETIES-Bendable-Comfortable-Thin-Medium-Textures/dp/B0CV2GMSR8/ref>. (Year: 2023).*

Bora Bora Large Flat Round Hair Clip [online], [publication date is Apr. 9, 2024]. [Retrieved from the internet on Apr. 9, 2024]. URL: <https://www.teleties.com/products/bora-bora-large-flat-round-hair-clip>. (Year: 2024).*

Product: Kaxi Lay Down Claw 2.0 (8 Colors) , [online]. URL: https://www.shopkaxi.com/collections/all-products/products/kaxi-lay-down-claw-2-1>. Date last accessed: Mar. 4, 2024.

Product: Duckbill Claw Clip—Multiple Colors, [online]. URL: <https://www.shopandi.com/products/duckbill-claw-clip?variant=40447102091379>. Date last accessed: Mar. 4, 2024.

Product: Lay Down Claw Clip: [online]. URL: <https://blissandbellebotique.com/products/lay-down-claw-clip?pr_prod_start=e5_desc&pr_rec_id=dc12661eb&pr_rec_pid=6923209080855&pr_ref_pid=6940501508119&pr_seq=uniform>. Date Last Accessed: Mar. 4, 2024.

Product: Flat Lay Claw Clip 2pc-Black & Tort, [online]. URL: <https://www.mykitsch.com/products/rabs-flat-lay-claw-clip-2pc-flat-black-tort?pr_prod_strat=jac&pr_rec_id=d23ee67c4&pr_rec_pid=7319130079413&pr_ref_pid=7285782315189&pr_seq=uniform>. Date Last Accessed: Mar. 4, 2024.

* cited by examiner (Canceled)

(Canceled)

(Canceled)

(Canceled)

(Canceled)

(Canceled)

(Canceled)

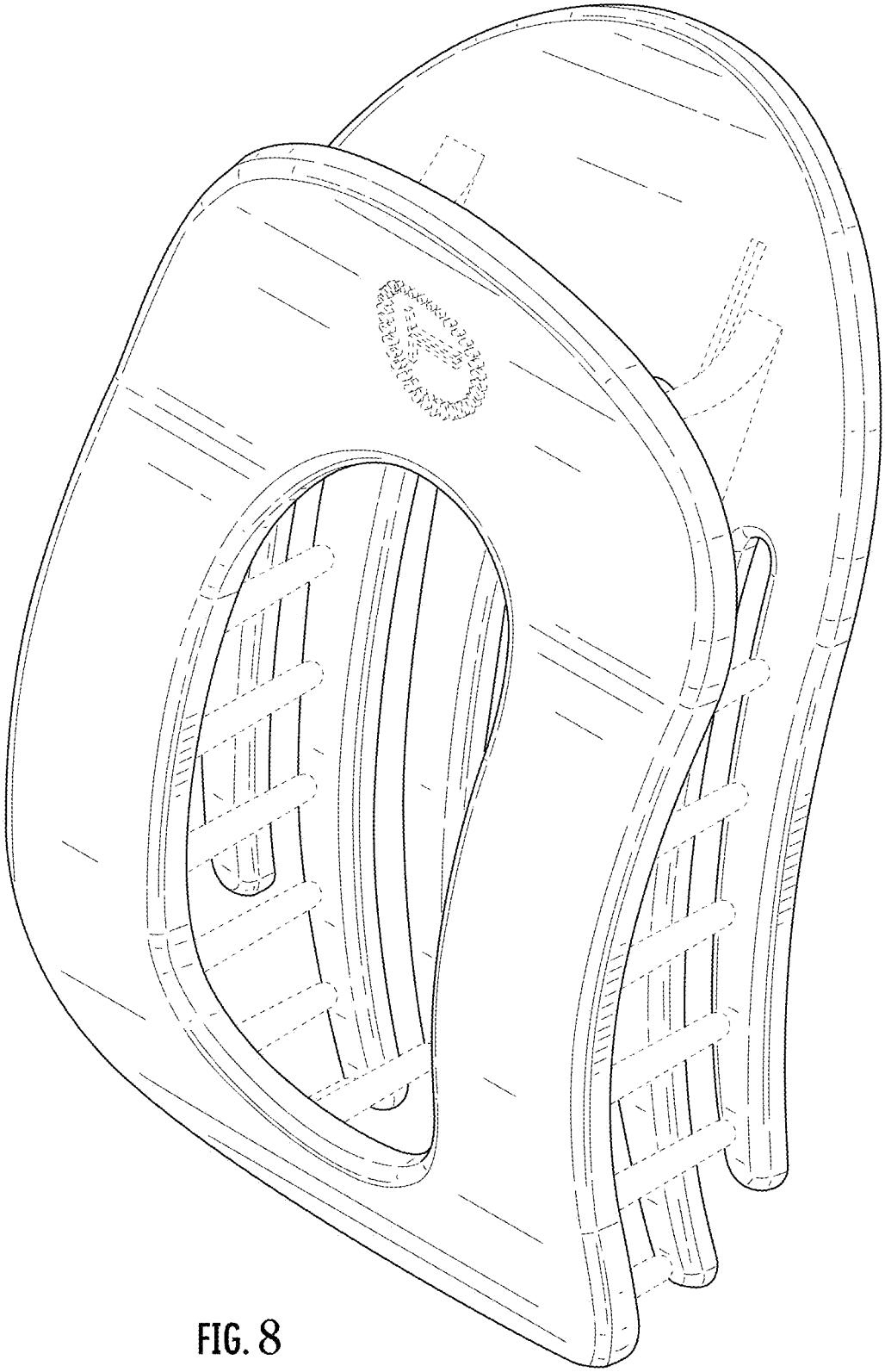
FIG. 8
(Amended)

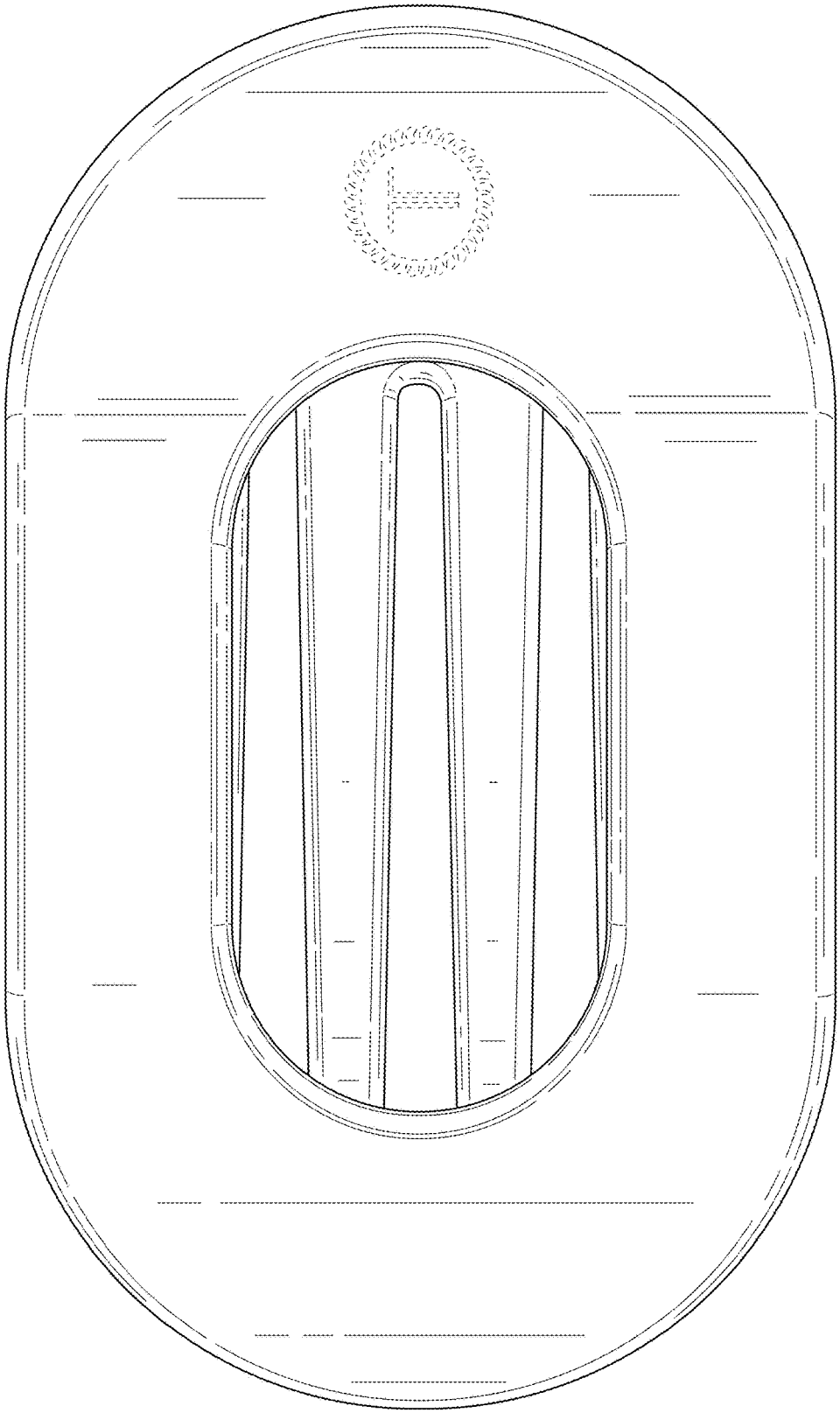
FIG. 9
(Amended)

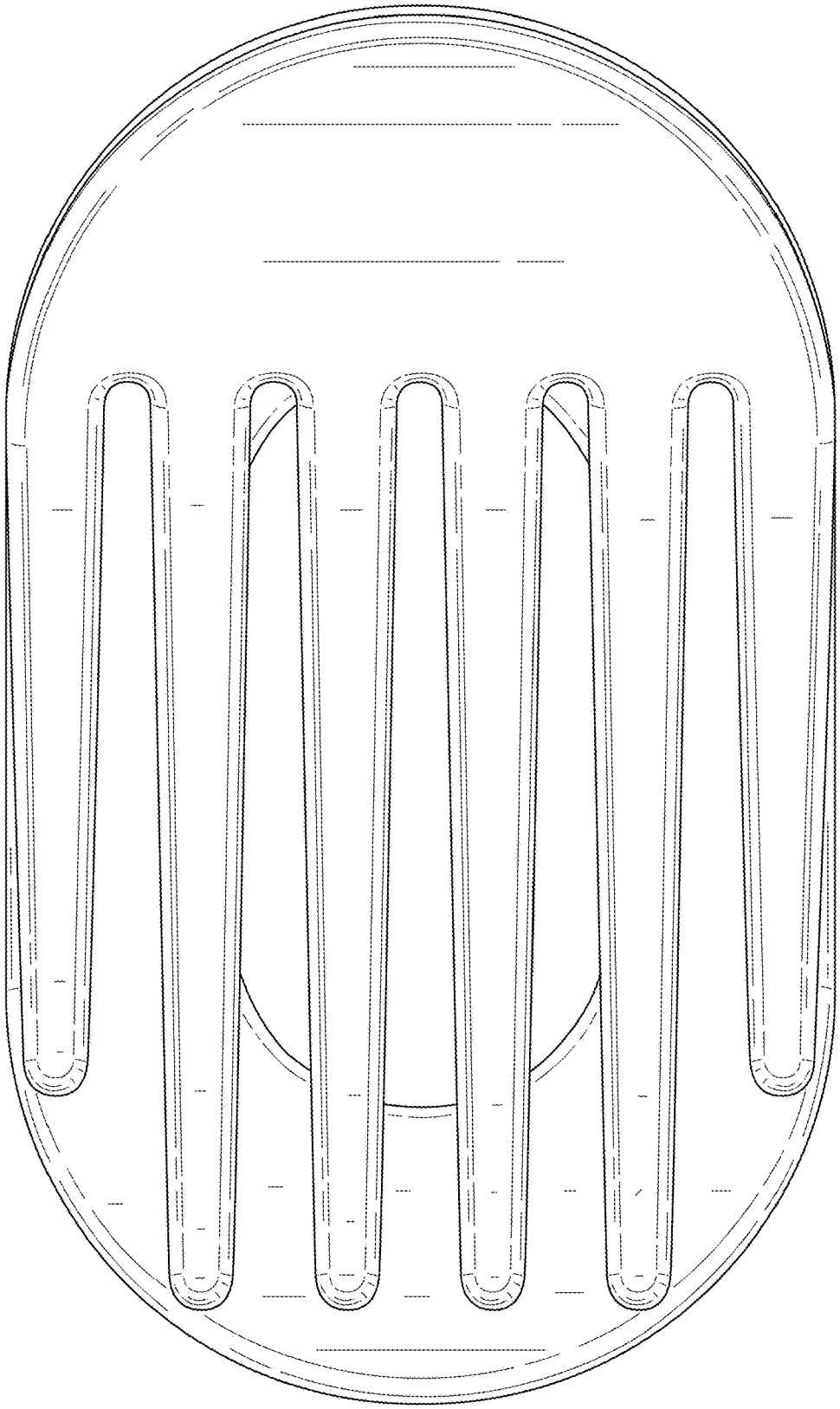
FIG. 10
(Amended)

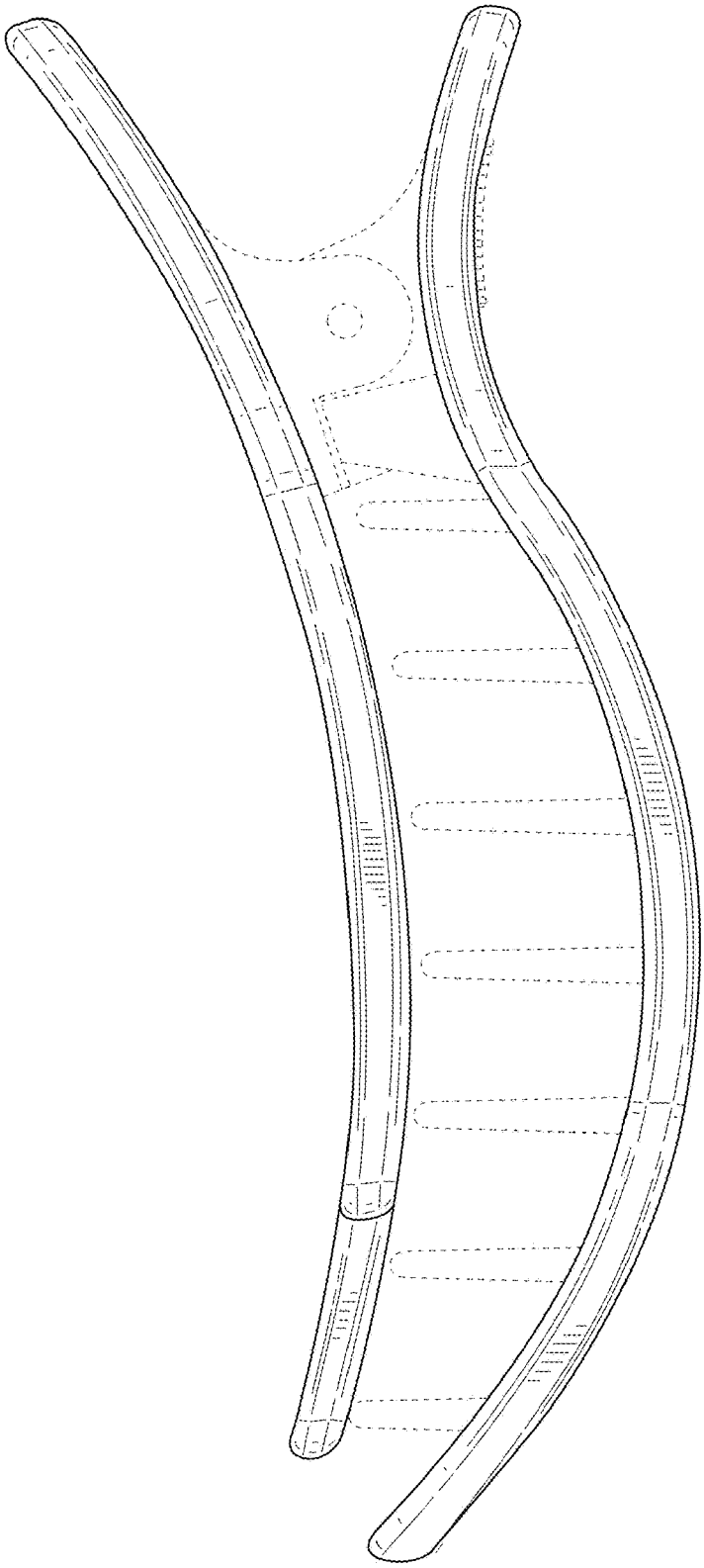
FIG. 11
(Amended)

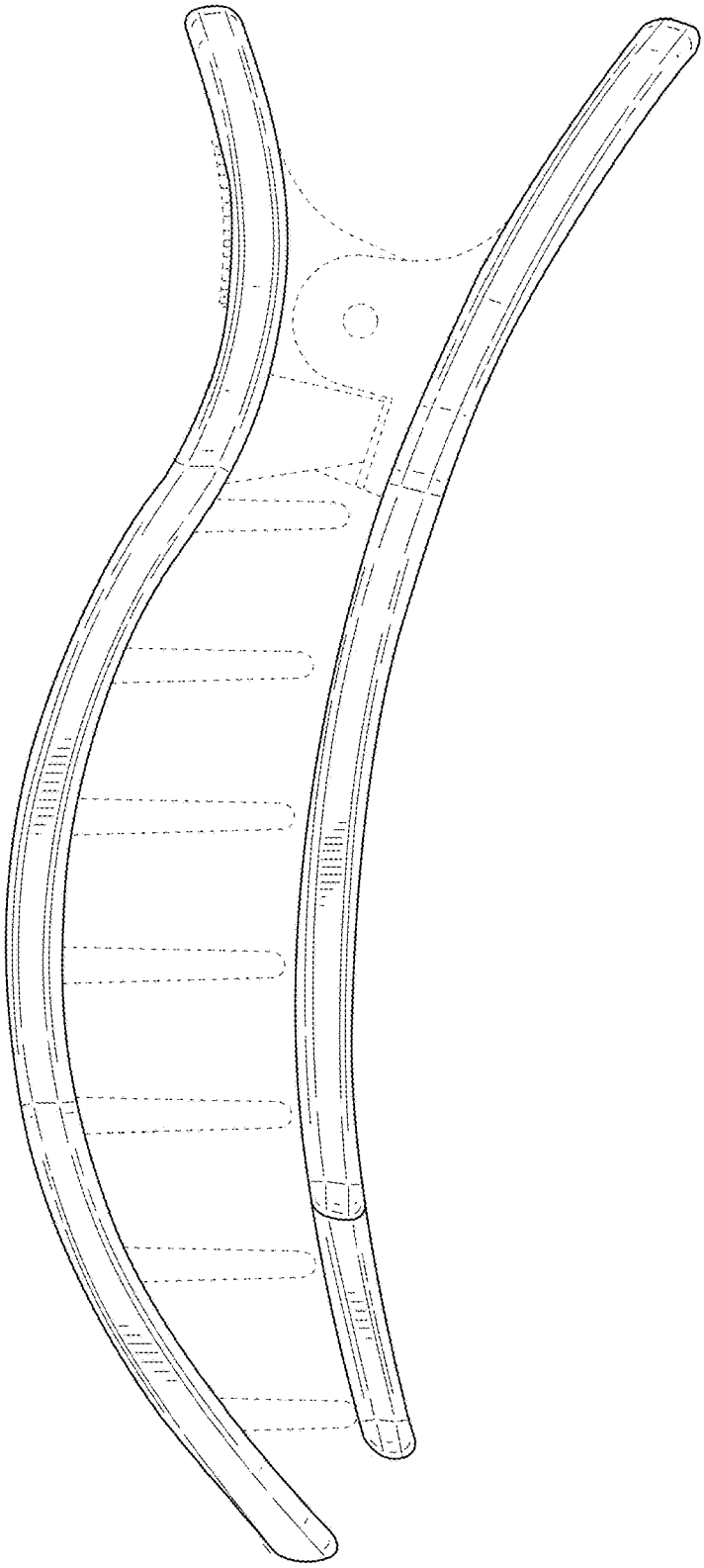
FIG. 12
(Amended)

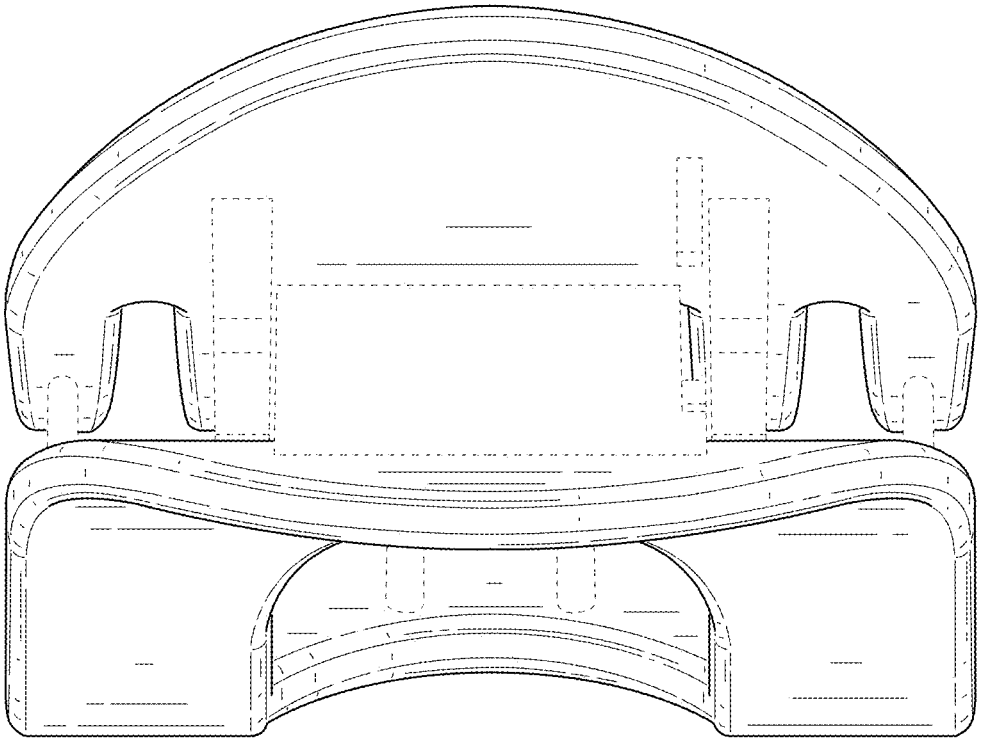
FIG. 13
(Amended)

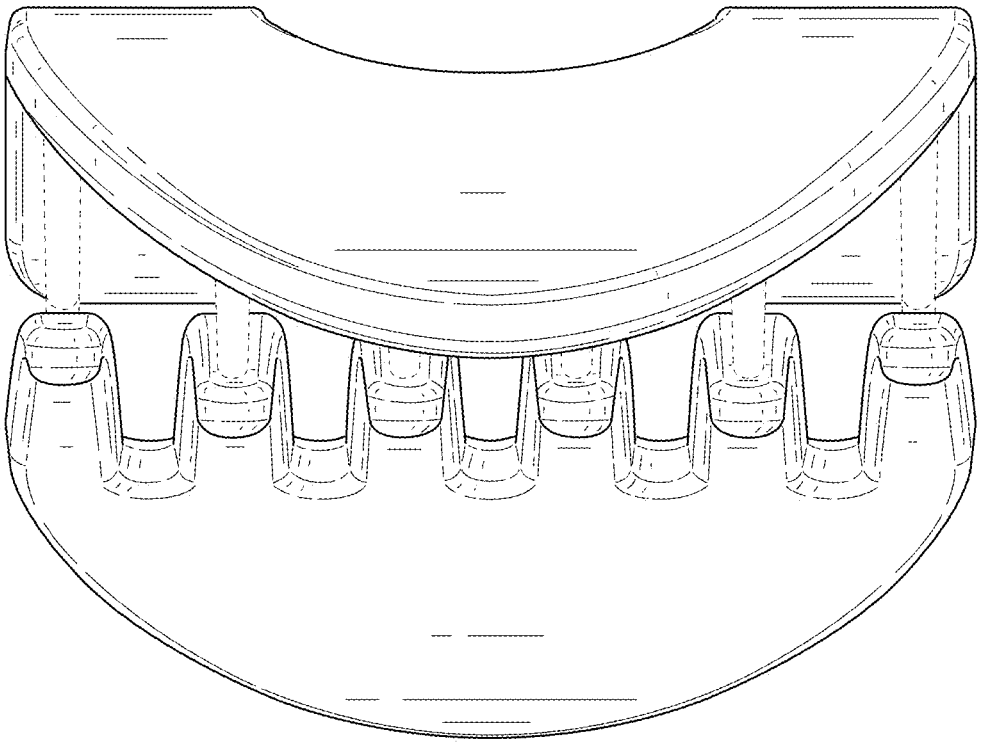
FIG. 14
(Amended)

(Canceled)

(Canceled)

(Canceled)

(Canceled)

(Canceled)

(Canceled)

(Canceled)